(12) United States Patent
Branecky

(10) Patent No.: US 6,943,524 B2
(45) Date of Patent: Sep. 13, 2005

(54) SWITCHED RELUCTANCE MOTOR REGULATION

(75) Inventor: Brian Thomas Branecky, Oconomowoc, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 37 days.

(21) Appl. No.: 10/731,369

(22) Filed: Dec. 9, 2003

(65) Prior Publication Data

US 2005/0122081 A1 Jun. 9, 2005

(51) Int. Cl.$^7$ ................................................. H02P 5/05
(52) U.S. Cl. ........................................ 318/701; 318/254
(58) Field of Search ................................. 318/254, 701, 318/437

(56) References Cited

U.S. PATENT DOCUMENTS

| | | | |
|---|---|---|---|
| 4,019,107 A | | 4/1977 | Dixon et al. |
| 4,129,809 A | | 12/1978 | Rosa |
| 4,739,240 A | | 4/1988 | MacMinn et al. |
| 4,740,738 A | * | 4/1988 | El-Antably et al. .......... 318/701 |
| 4,933,620 A | | 6/1990 | MacMinn et al. |
| 5,012,172 A | * | 4/1991 | Sember ....................... 318/696 |
| 5,084,663 A | | 1/1992 | Olsson |
| 5,196,775 A | | 3/1993 | Harris et al. |
| 5,789,893 A | | 8/1998 | Watkins |
| 5,955,861 A | | 9/1999 | Jeong et al. |
| 6,014,003 A | * | 1/2000 | French ....................... 318/701 |
| 6,411,060 B1 | | 6/2002 | Jung |
| 6,414,462 B2 | | 7/2002 | Chong |
| 6,448,736 B1 | | 9/2002 | Lajsner et al. |
| 6,697,270 B1 | * | 2/2004 | Kalman et al. ............... 363/51 |
| 6,788,021 B2 | * | 9/2004 | Sozer et al. ................. 318/701 |

OTHER PUBLICATIONS

T.J.E. Miller, Switched Reluctance Motors and Their Control, Chapter 4, Dynamic Operation, pp. 53–57, Magna Physics Publishing, Hillsboro, OH, and Oxford University Press, Oxford, UK, 1993.

* cited by examiner

Primary Examiner—Bentsu Ro
(74) Attorney, Agent, or Firm—Michael Best & Friedrich LLP

(57) ABSTRACT

A motor control system that switches between voltage control and angle control. The motor control system includes a comparator, an angle control, and a voltage control.

24 Claims, 4 Drawing Sheets

SWITCHED RELUCTANCE MOTOR REGULATION

BACKGROUND OF THE INVENTION

The invention relates to a switched reluctance ("SR") motor. More particularly, the invention relates to a method and system of regulating the speed of an SR motor.

SR motors have multiple poles on both the stator and the rotor. There are windings or coils wound on the stator poles, and each pair of windings on diametrically opposite stator poles is connected in series to form an electrically independent phase of the SR motor. There are no windings or magnets on the rotor. However, the rotor is made of a magnetically permeable material such as, for example, a ferrous alloy. Each rotor also has a rotor position relative to the stator. To run a SR motor efficiently, it is necessary to determine the rotor position with respect to the stator. The rotor position also establishes which phase of the stator or a firing angle or a turn-on angle is to be energized or commutated first by applying different amounts of current or voltage in the windings. If the rotor position is incorrect, commutation of one of the stator phases may result in inefficient or improper operation of the motor.

A typical SR motor controller uses a peak detection method to control the firing angle or the turn-on angle in a sensorless operation. Particularly, the controller uses the peak detection method to locate peaks from the different amounts of current commanded by the motor. However, the peak detection method requires that a maximum voltage (that varies with speed) not be exceeded. When the maximum voltage is exceeded, peaks will not be detected. As a result, the rotor position will be lost. If the rotor position is lost, the controller loses track of where voltage or current should be applied, and subsequently shuts down the SR motor. Inability to exceed the maximum voltage limit also prevents the SR motor from generating full torque at low speed or near zero speed. Furthermore, the sluggishness of the voltage control also prevents the fast dynamic response needed at the lower speeds.

SUMMARY OF THE INVENTION

When a switched reluctance ("SR") motor is run under constant volts per Hertz ("V/Hz") with a voltage control, a given firing angle or a turn-on angle will provide a relatively constant torque, regardless of speed of the SR motor. When a voltage commanded by the SR motor is equal to the constant V/Hz, a peak in the current can be detected or obtained with a peak detection method. Once a peak in the current has been detected, a corresponding rotor position can also be determined. That is, the peak detection will generate a peak as long as the commanded voltage equals the constant V/Hz. As a result, the rotor position can also be determined with the detected peak. In such a case, firing angle or turn-on angle commanded by the SR motor will also respond quickly to changes in speed of the SR motor.

While generating the necessary torque at slow speed with the voltage control is difficult, controlling the turn-on angle of light loads at any speed is similarly difficult because increasing speed at any load increases an associated motor friction and wind drag. Running the motor faster requires the angle control to fire an angle command earlier, or more frequently. However, more frequent angle firings will result in an increase in an inductance charge time, thereby changing the waveform representing the current applied such that the peak occurs later in the waveform. Consequently, more current is accumulated in the windings, which eventually leads to the inability to detect the peak with a given time. As in the case with the voltage control, the controller loses track of where voltage or current should be applied, and subsequently shuts down the SR motor.

Accordingly, there is a need for a system and method to control motor speed. The present invention provides a method of controlling a motor running at an operating speed. The method comprises the steps of determining a speed error between the operating speed and a commanded speed, adjusting a turn-on angle in response to the speed error, and switching to a voltage control when the turn-on angle reaches a retardation limit.

The present invention also provides a control system for a motor. The control system comprises a speed comparator that compares a feedback speed with a commanded speed. The speed comparator also generates a speed difference between the feedback speed and the commanded speed. The control system further comprises an angle regulator that is coupled to the speed comparator. The angle regulator receives the speed difference, and adjusts a turn-on angle in response to the speed difference. The control system further comprises a voltage control that is activated when the turn-on angle reaches a retardation limit, and that generates a voltage command.

Other features and advantages of the invention will become apparent to those skilled in the art upon review of the following detailed description, claims, and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION OF THE EMBODIMENT

Figure 1:
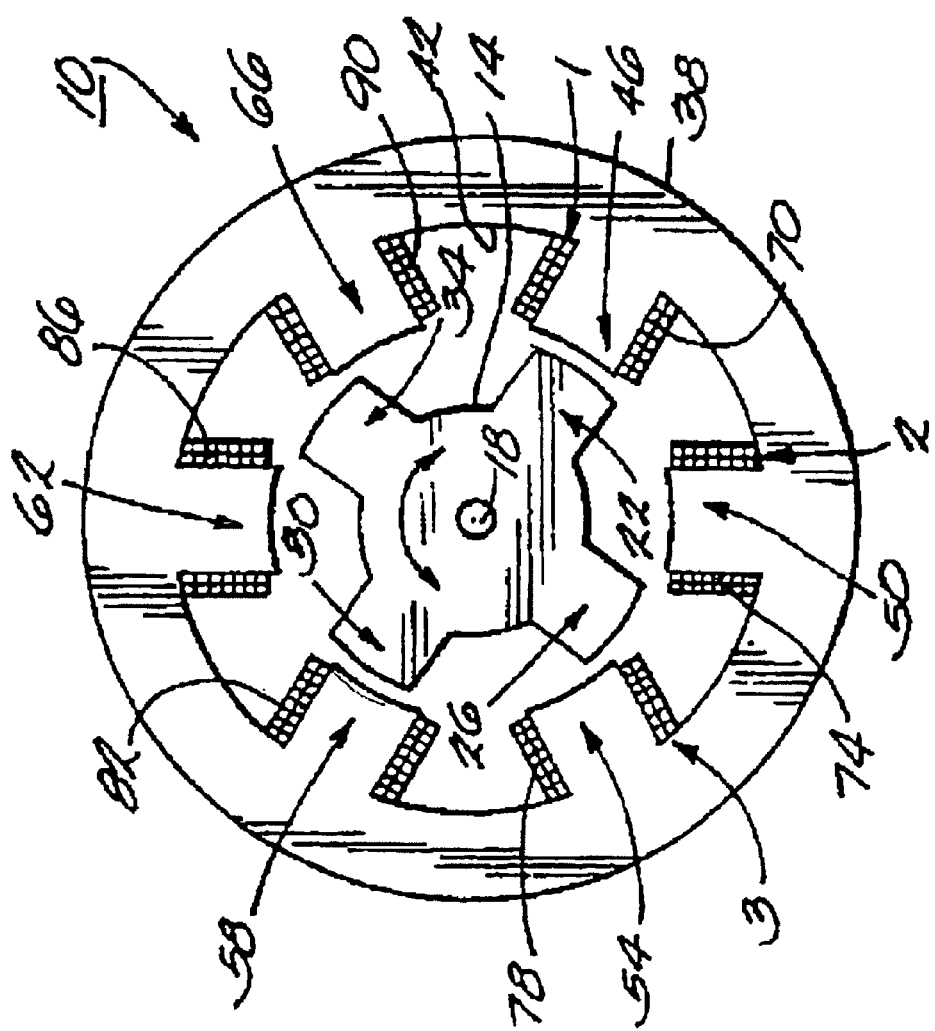
FIG. 1 shows an exemplary switched reluctance motor with a 6-4 stator to rotor ratio.

FIG. 1 illustrates a schematic view of a switched reluctance ("SR") motor 10 embodying the invention. The SR motor 10 includes a rotor 14 mounted for rotation about an axis 18. The rotor 14 includes four rotor poles 22, 26, 30 and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and six stator poles 46, 50, 54, 58, 62 and 66, extending from the inner surface 42 inwardly toward the rotor axis 18. The stator poles 46, 50, 54, 58, 62 and 66 are evenly spaced about the inner surface 42 of the stator 38. Because the motor 10 includes six stator poles and 4 rotor poles, the switched reluctance motor 10 shown in FIG. 1 is referred to as a 6/4 (6 stator pole to 4 rotor pole ratio) switched reluctance motor. While the description will refer to the operation of the invention in terms of a 6/4 SR motor, it should be understood that any switched reluctance motor having any number of stator poles or rotor poles can be controlled with the circuit disclosed herein.

The SR motor 10 also includes windings or coils 70, 74, 78, 82, 86 and 90, on the stator poles 46, 50, 54, 58, 62 and 66, respectively. The windings are made of a conductor of a precise gauge which is wound around the stator pole a precise number of times or turns. The gauge of the wire and the number of turns vary depending upon the application. The description applies equally to any SR motor using any gauge wire or having any number of turns.

The windings 70, 74, 78, 82, 86 and 90, on diametrically opposite stator poles 46, 50, 54, 58, 62 and 66, respectively, are connected in series to form three electrically independent phases 1, 2 and 3 of the SR motor 10. As shown in FIG. 1, the windings 70 and 82 on stator poles 46 and 58, respectively, form pole pairs which together form phase 1. The windings 74 and 86 on stator poles 50 and 62, respectively, form pole pairs which together form phase 2. The windings 78 and 90 on stator poles 54 and 66, respectively, form pole pairs which together form phase 3. Because the rotor 14 is made of ferromagnetic material, energizing a particular phase of the motor 10 results in the formation of a magnetic attraction between the windings on the stator pole pairs comprising the energized phase and the rotor poles closest to the stator poles of the energized phase. By energizing the phases in a particular manner, the rotational direction and speed of the rotor can be precisely controlled.

Although the preferred embodiment of the invention is practiced using an SR motor, the invention can be practiced using any type of motor that includes a rotor that needs to be aligned prior to starting the motor.

Figure 2:
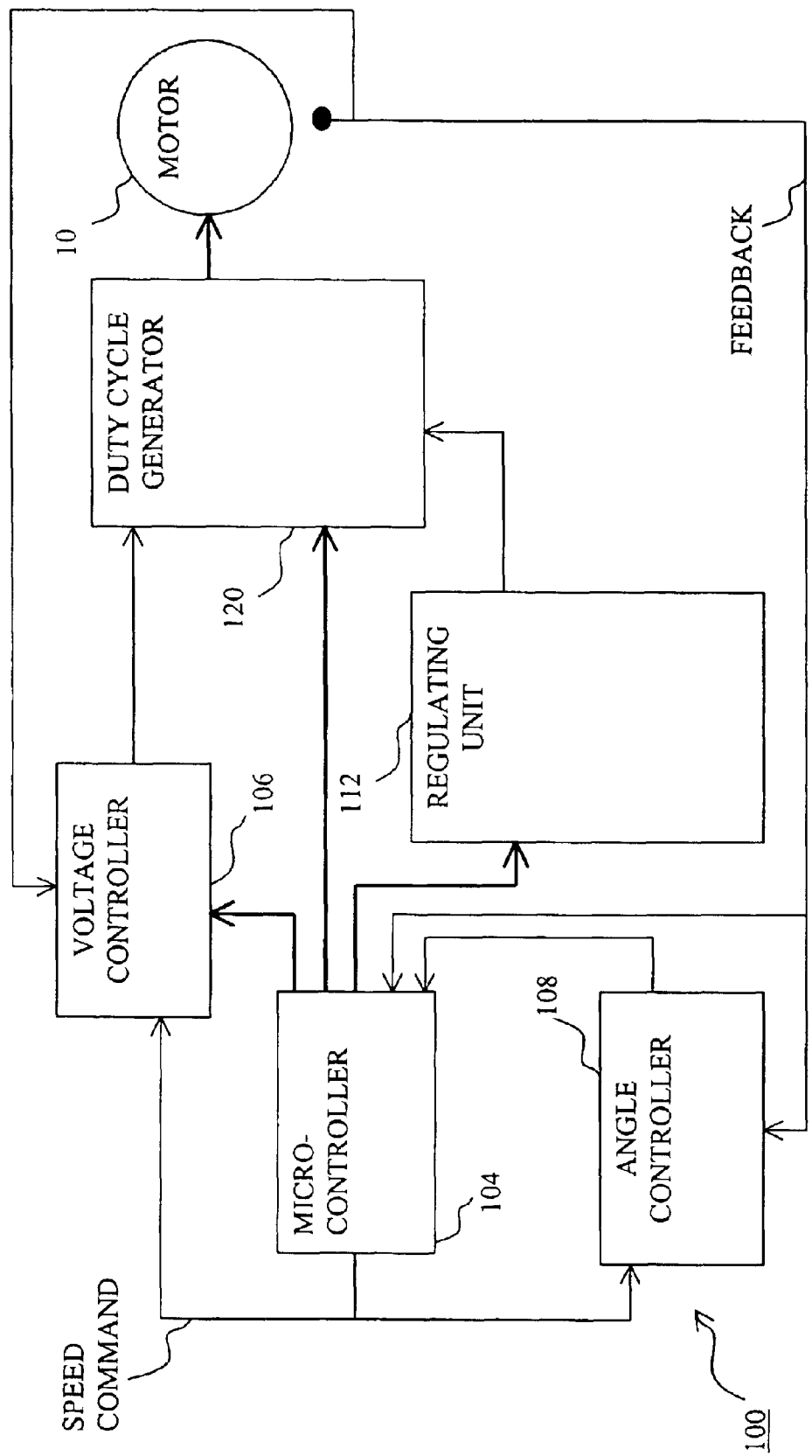
FIG. 2 shows a system block diagram of a motor control system according to the invention.

FIG. 2 shows a block diagram of a motor control system 100 for controlling an SR motor 10. The control system 100 includes a signal processor or a micro-controller 104 that generates a speed command. A voltage controller 106 then generates a voltage signal based on a difference between the speed command and a feedback signal from the SR motor 10. To generate a voltage command, the voltage controller 106 converts the speed command into a corresponding voltage. The control system 100 is also configured to control the turn-on angle of the SR motor with an angle controller 108. Particularly, the angle controller 108 adjusts or generates a turn-on angle or an angle signal based also on the speed command from the micro-controller 104 and the feedback signal.

To smoothly transition from angle control to and from voltage control, a regulating unit 112 is used. The regulating unit 112 generally includes a set of integrators or voltage regulators that are selectively activated by the micro-controller 104 based generally on angles generated by the angle controller 108 and the feedback signal. The regulating unit 112 generally outputs a regulated signal based on the angle signal generated by the angle controller 108 and processed by the micro-controller 104. The regulated signal is then fed to a duty cycle ("dc") generator 120. The dc generator 120 processes the regulated signal with the voltage signal, and produces a motor operating voltage to the motor 10. Particularly, the dc generator 120 adjusts an operating frequency of the motor 10 using the regulated signal and the voltage signal, detailed hereinafter. Furthermore, the voltage controller 106 generates a voltage signal to the motor 10 by commanding a specific dc or frequency to the dc generator 120. For example, if a bus voltage ("$V_{bus}$") associated with the motor 10 from the micro-controller 104 is 600V, the micro-controller 104 commands a 50% dc, and the regulating unit 112 commands a 50% regulated signal, the dc generator 120 will a generate 150V output. Although the micro-controller 104 is shown as an individual component of the system 100 in FIG. 1, some or all of the components such as the voltage controller 106, the angle controller 108, the regulating unit 112, and the duty cycle generator 120, can be integrated in the micro-controller 104. Furthermore, the micro-controller 104 can be a general purpose processor, or a general signal processor such as digital signal processor ("DSP") TMS320F240 from Texas Instruments ("TI"), or any application specific integrated circuit ("ASIC"), any field programmable gate array ("FPGA"), and the like.

Figure 3:
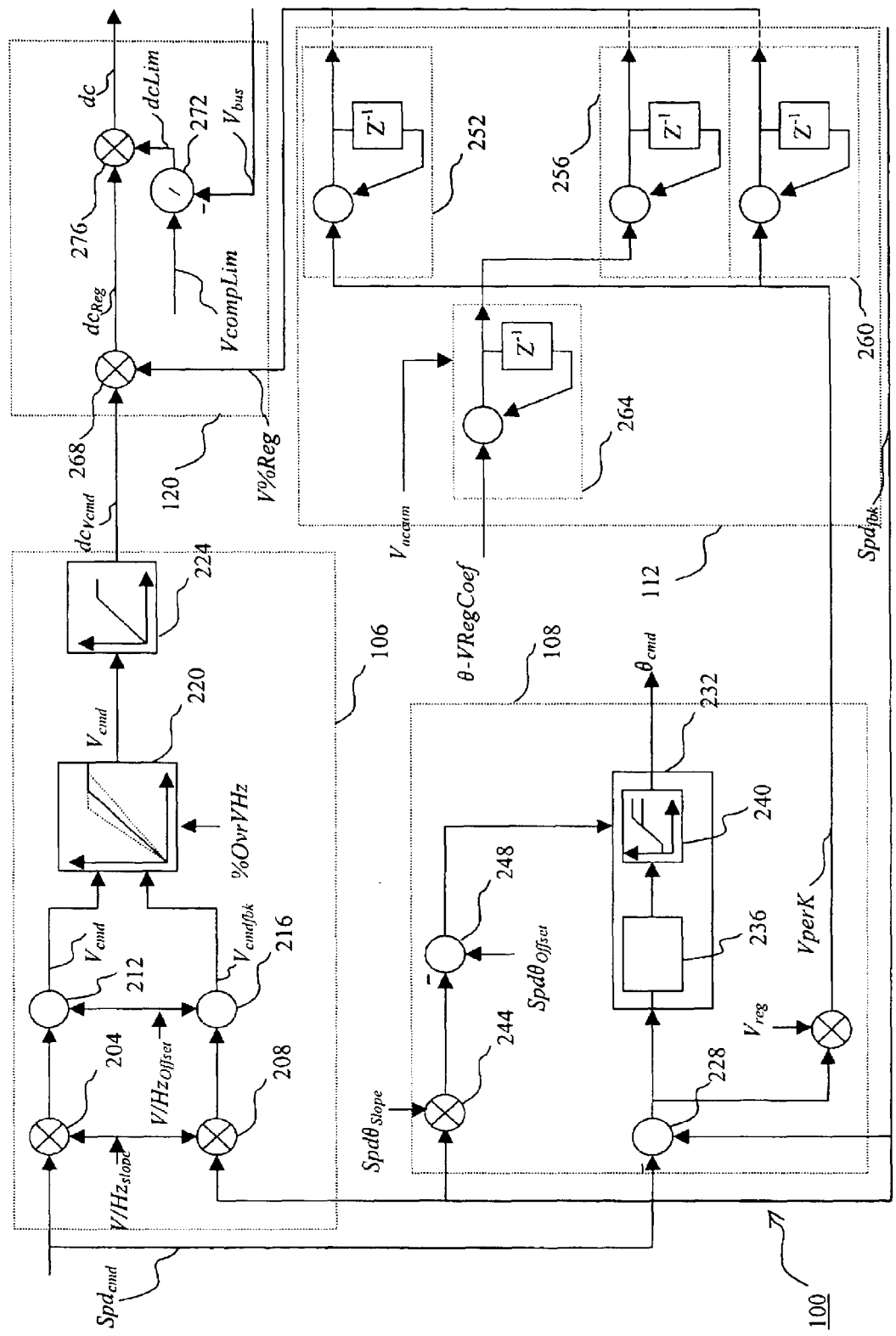
FIG. 3 shows a detailed system block diagram of the motor control system shown in FIG. 2 according to the invention.

FIG. 3 illustrates a detailed system diagram for a portion of the control system 100 according to the invention, wherein like numerals will be used to reference like parts. Specifically, the voltage controller 106 includes a first multiplier 204, a second multiplier 208, a first summer 212, and a second summer 216. When a speed is commanded by the micro-controller 104 (of FIG. 2, not shown in FIG. 3), the speed command ("$Spd_{cmd}$") generated by the micro-controller 104 is multiplied by a predetermined voltage-frequency slope ("$V/Hz_{slope}$") from the micro-controller 104 at the first multiplier 204 to generate a first product. The first product is subsequently added to a predetermined voltage-frequency offset $V/Hz_{Offset}$ at the first summer 212 to produce an initial voltage command ("$V_{cmd}$"). That is, $V_{cmd}$ is a linear combination of $V/Hz_{slope}$ and $V/Hz_{Offset}$, or, $$V_{cmd} = V/Hz_{slope} \times Spd_{cmd} + V/Hz_{Offset}.$$

Although deriving $V_{cmd}$ involves a linear voltage-frequency relationship, such as a constant voltage frequency relationship, other voltage-frequency relationships such as a second order voltage-frequency relationship can also be used. Similarly, the speed feedback ("$Spd_{fbk}$") is also converted into a voltage feedback ("$V_{cmdfbk}$") using the same voltage-frequency constants $V/Hz_{slope}$ and $V/Hz_{Offset}$, at the second multiplier 208 and the second summer 216. That is, $V_{cmdfbk}$ is also a linear combination of $V/Hz_{slope}$ and $V/Hz_{Offset}$, or, $$V_{cmdfbk} = V/Hz_{slope} \times Spd_{fbk} + V/Hz_{Offset}.$$

Both $V_{cmdfbk}$ and $V_{cmd}$ are fed to a voltage limiter 220 to generate a limited $V_{cmd}$. Generally, the voltage limiter 220 uses a set of voltage percent limits to limit how much voltage can be supplied to the motor 10. That is, the voltage limiter 220 can limit $V_{cmd}$ to within a predetermined percentage over V/Hz ("%OvrVHz") of $V_{cmd}$. For example, when $V_{cmdfbk}$ is less than %OvrVHz×$V_{cmd}$, $V_{cmd}$ will be limited or reduced to %OvrVHz×$VC_{cmd}$. However, when $V_{cmdfbk}$ is greater than (2−%OvrVHz) ×$V_{cmd}$, $V_{cmd}$ will be limited to (2−%OvrVHz) ×$V_{cmd}$. A typical value of %OvrVHz is about 90%, although other values can also be used depending on application and design.

Thereafter, the limited $V_{cmd}$ is converted to a particular dc by a compensation unit 224 to generate a compensated dc based on $V_{cmd}$ ("$dc_{Vcmd}$"). For example, if a $V_{cmd}$ of 320V is commanded based on a $V_{bus}$ of 300V, the compensation unit 224 will generate a $dc_{Vcmd}$ of 100%. On the other hand, if a $V_{cmd}$ of 150V is commanded based the same $V_{bus}$ of 300V, the compensation unit 224 will generate a $dC_{Vcmd}$ with 50%. In other words, the control system 100 cannot command a voltage greater than the system 100 can supply. Thereafter, $dc_{Vcmd}$ is further modified by the dc generator 120, which will be detailed hereinafter.

Figure 4:
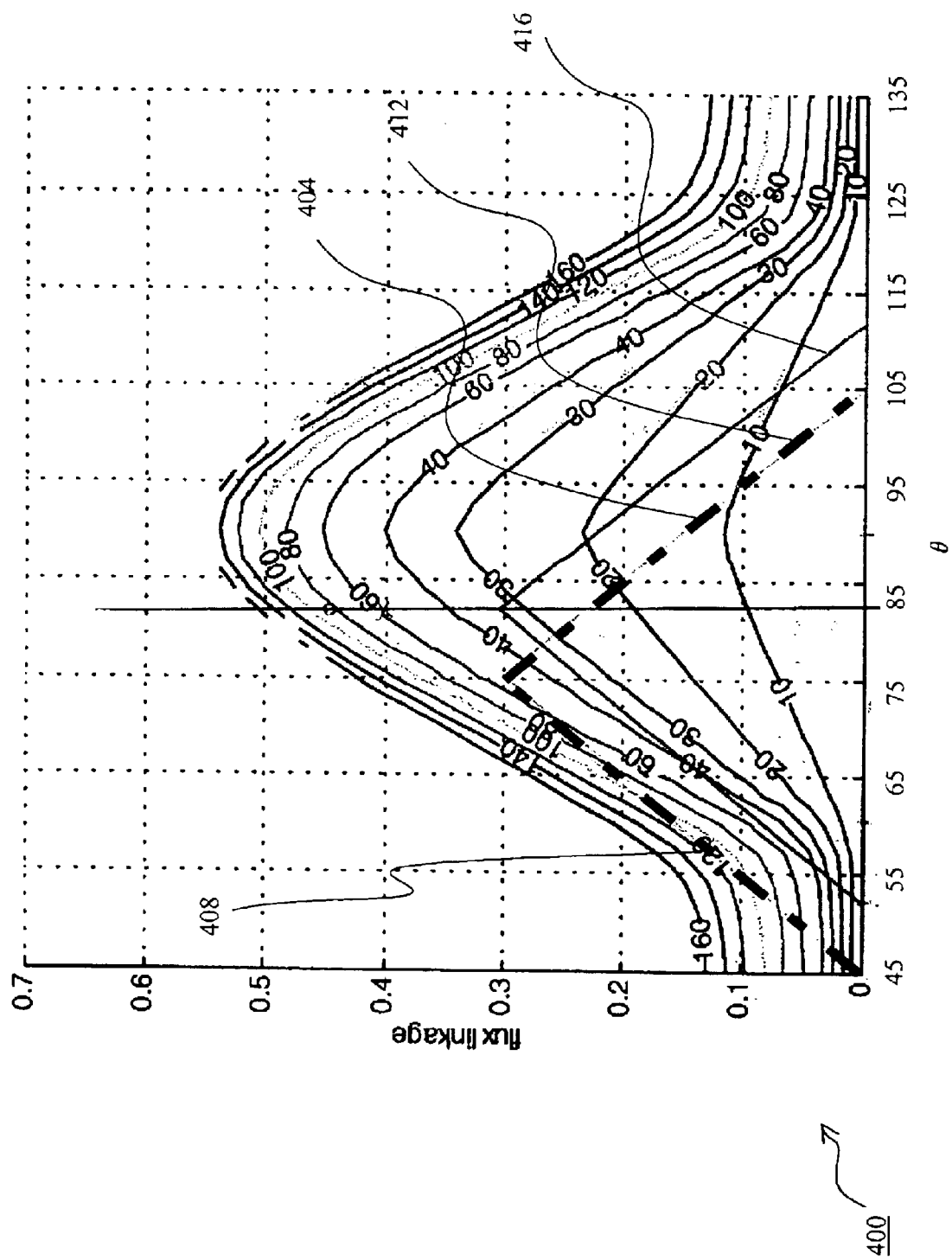
FIG. 4 shows a flux linkage and current characteristics plot of the switched reluctance motor in FIG. 1.

FIG. 4 shows a flux linkage and current characteristics plot 400 of the SR motor 10 in FIG. 1. The flux linkage and current characteristics plot 400 of the SR motor 10 can be obtained by a variety of analysis techniques such as finite element analysis. The x-axis of the plot 400 indicates a rotor angle, θ, which shows whether a pole tip of the rotor 18 is aligned with a pole tip of the stator 38. When θ is 45°, a pole tip of the rotor 18 and a pole tip of the stator 38 are unaligned. When θ is 90°, a pole tip of the rotor 18 and a pole tip of the stator 38 are aligned. The plot 400 thus shows the current characteristics of the SR motor 10 in response to a variety of flux linkage and rotor angles. More specifically, if a constant voltage is applied to the windings 70, 74, 78, 82, 86, or 90 at a turn-on angle of 45°, and as the pole tips of the stator 38 and the rotor 18 are moving, a slope of the flux linkage starts to increase. When the rotor angle, θ passes a turn-off angle of 75°, the slope of the flux linkage starts to decrease.

Overlaid on the plot 400 is a controlled operating triangular function 404. The triangular function has a pair of slopes, an increasing slope 408, and a decreasing slope 412. The increasing slope 408 of the triangular function 404 represents a constant voltage. The constant voltage level is specified according to a constant volts-per-hertz relationship as discussed earlier. As shown in the function 404, a rated volts-per-hertz will cause the flux linkage to peak at 0.3 after a voltage is applied to the windings 70, 74, 78, 82, 86, or 90, with a dwell angle of 30°. When the SR motor 10 is turned off, a reverse voltage is applied, and the flux linkage will decrease at a same rate. That is, if the voltage is applied for 30°, then it will take 30° to get the flux out of the winding. When more torque is needed, the turn-on angle is advanced which slides the triangle 404 to the left until an advance limit, for example 35°, is reached. An exemplary shift of 7° is shown in a second triangular function 416.

However, if less torque is commanded, the rotor angle is first retarded until a retardation limit is reached. The retardation limit generally varies, for example between 52° and 55° based on speed commanded. Retarding the angle beyond the retardation limit will cause no peak in the current, thus the position of the rotor 18 cannot be detected. If even less torque is needed, voltage on the windings is decreased with the regulating unit 112. Specifically, switching from adjusting the rotor angle to adjusting the voltage on the windings is the point at which the controller 100 switches from angle control to voltage control. Decreasing the voltage in the windings, or decreasing the V/Hz, will result in a change in the slope on the triangular function. For example, if rated V/Hz causes the flux linkage to peak at 0.3, or 30° after the turn-on angle, then ½ V/Hz will cause the flux to peak at 0.15, or 30° after the turn-on angle while still maintaining a peak in the current.

Referring back to FIG. 2, in an angle control mode, the angle controller 108 generates a turn-on angle or an angle command ("$\theta_{cmd}$") that is determined from a speed error ("$Spd_e$"). Specifically, the angle controller 108 generally includes a third summer 228, an angle regulator 232, a third multiplier 244, and a fourth summer 248. When $Spd_{cmd}$ is compared with $Spd_{fbk}$ at the third summer 228, $Spd_e$ is obtained. Specifically, $Spd_e = Spd_{fkb} - Spd_{cmd}$. When $\theta_{cmd}$ decreases which means angle commands are advanced as described, more torque is generated. The angle regulator 232 also includes an integrator 236 to generate $\theta_{cmd}$. The integrator 236 constantly integrates or adjusts $\theta_{cmd}$ until $Spd_{fbk}$ equals $Spd_{cmd}$, or when $Spd_e$ is zero.

In the embodiment shown, the integrator 236 is a proportional integral ("PI") regulator or controller. The $\theta_{cmd}$ is also further limited in an angle limiter 240. To generate a set of limits used by the angle limiter 240, the angle controller 108 uses the third multiplier 244, and the fourth summer 248. Specifically, a precise $\theta_{cmd}$ has to be limited between a high limit and a low limit such that the peak detection method will be able to detect a peak. Specifically, the angle limiter 240 includes a high limit ("$R_{LIMIT}$") that is determined as follows:

$$R_{LIMIT} = Spd_{fbk} \times Spd\theta_{slope} - Spd\theta_{offset}$$

where $Spd\theta_{slope}$ and $Spd\theta_{offset}$ are predetermined slope and offset of a retardation line. That is, when $Spd_{fbk}$ is inserted into the retardation line via the angle multiplier 244 and the angle offset summer 248, a linear combination of $Spd\theta_{slope}$ and $Spd\theta_{offset}$ or $R_{LIMIT}$ is established in the angle limiter 240. The angle limiter 240 will clip off any $\theta_{cmd}$ that is greater than $R_{LIMIT}$, and generates an updated or regulated $\theta_{cmd}$, or any $\theta_{cmd}$ that is below the low limit. The low limit used in the angle limiter is generally an empirical value, for example, about 35°, although other values can also be used depending on speed and load requirement.

Thereafter, $\theta_{cmd}$ is fed to the micro-controller 104 for further processing. Meanwhile, a voltage percent constant ("VperK") is also obtained from multiplying $Spd_e$ and a voltage regulator constant ("$V_{Reg}$"). Particularly, VperK reflects how much $Spd_e$ or speed error there is in the motor 10. Depending upon the value of VperK and a set of selective command from the micro-controller 104 (FIG. 1), the regulating unit 112 (FIG. 1) switches between voltage control and angle control.

To switch between voltage control and angle control, the regulating unit 112 generally includes a plurality of regulators or integrators, such as a decrease-only regulator 252, an increase-only regulator 256, and a normal regulator 260. For example, once $\theta_{cmd}$ has been determined at the angle controller 108, $\theta_{cmd}$ is first compared with a predetermined retardation limit threshold ("$R_{threshold}$") at the micro-controller 104. If $\theta_{cmd}$ is within $R_{threshold}$ degrees of the retardation limit, the micro-controller 104 will activate the decrease-only regulator 248. Specifically, if a voltage regulating percentage ("V%reg") is at least above some predetermined percentage, for example, 25%, and $Spd_{fbk}$ is greater than $Spd_{cmd}$, the micro-controller 104 will activate the decrease-only integrator or regulator 252 because the actual motor speed is too fast compared to the speed commanded. Furthermore, the micro-controller 104 will also set a voltage accumulator flag ("$V_{acuum}$Flag") to FALSE, and a voltage accumulator variable ("$V_{acuum}$") to zero. Specifically, the decrease-only integrator 252 will reduce V%reg such that the voltage applied to the motor 10 is eventually reduced or scaled. As a result of reducing the voltage supplied to the motor 10, the speed of the motor 10 is reduced accordingly. When $Spd_{fbk}$ is slow enough such that $\theta_{cmd}$ is outside $R_{threshold}$ degrees of the retardation limit, other integrators of the regulating unit 112 will be activated as described hereinafter.

When $\theta_{cmd}$ is outside $R_{threshold}$ degrees of the retardation limit, the micro-controller 104 will activate either the increase-only integrator 256 or the normal integrator 260 depending on variables such as $V_{acuum}$Flag, V%reg, and $\text{Spd}_{fbk}$.

Furthermore, the control system 100 also provides a cascade accumulator 264 to provide a ramping variable to the increase-only integrator 256. For example, if the control system 100 increases the speed of the motor 10 for a first time, the ramping integrator 264 will be activated if $V_{acuum}$Flag is TRUE. Meanwhile, $V_{acuum}$ is fed to the increase-only integrator 256 to smoothly transition to the voltage increase.

When $V_{acuum}$Flag is TRUE, $\text{Spd}_{fbk}$ is less than $\text{Spd}_{cmd}$, and V%reg is less than a preset percentage, for example, 50%, the micro-controller 104 will activate a plurality of regulators. For example, the micro-controller 104 will feed an angle-to-voltage regulator coefficient ("θ–VRegCoef") to the cascade accumulator 264 to smoothly ramp up the V%reg using the increase-only regulator 256 with θ–VregCoef after the initial zero ramp. The voltage increase will stop when $\text{Spd}_{fbk}$ is at least equal to $\text{Spd}_{cmd}$, or V%oreg is at least equal to the preset percentage, or $\theta_{cmd}$ again comes within $R_{threshold}$ degrees of the retardation limit.

The normal integrator 260 is activated and the micro-controller 140 will set flag $V_{acuum}$Flag to TRUE, when $\theta_{cmd}$ is outside $R_{threshold}$ degrees of the retardation limit, V%reg is less than the preset percentage, and $\text{Spd}_{fbk}$ is at least equal to $\text{Spd}_{cmd}$. When the normal integrator 260 is activated, it is an indication that $\text{Spd}_{fbk}$ is more than desired. In such case, the control system 100 will regulate the motor 10 based on VperK, which represents the speed error.

Thereafter, V%reg generated by the regulating unit 112 is fed to the dc generator 120 which includes a voltage compensation multiplier 268, a divider 272, and a duty cycle multiplier 276. Particularly, $\text{dc}_{Vcmd}$ generated by the voltage compensation unit 224 is multiplied by V%reg at the voltage compensation multiplier 268 to obtain a limited dc based on V%reg ("$\text{dc}_{Reg}$"). Meanwhile, a preset voltage compensation limit ("VcompLim") is divided by $V_{bus}$ to obtain a dc limit ("dcLim") at the divider 272. The limited dc based on V%reg ("$\text{dc}_{Reg}$") is multiplied by dcLim at the duty cycle multiplier 276 to obtain a dc that is supplied to the motor 10 (of FIG. 1, not shown in FIG. 2). For example, if both $\text{dc}_{Vcmd}$ and V%reg are 50%, $\text{dc}_{Reg}$ generated at multiplier 228 will be 25%. If VcompLim, which stands for the voltage compensation limit, is 300V, and $V_{bus}$ is 320V, dcLim obtained at divider 272 will be 93.75%. As a result the duty cycle generated multiplier 276 will be 23.4375%, which is exactly 75V based on $V_{bus}$ being 320V. Various features and advantages of the invention are set forth in the following claims.

What is claimed is:

1. A method of controlling a motor running at an operating speed, the method comprising:
   determining a speed error between the operating speed and a commanded speed;
   adjusting a turn-on angle in response to the speed error; and
   switching to a voltage control when the turn-on angle reaches a retardation limit.

2. The method of claim 1, wherein switching to the voltage control comprises:
   activating a regulator when the turn-on angle reaches a retardation limit; and
   scaling down a duty cycle output at the regulator; and
   reducing the control voltage.

3. The method of claim 1, further comprising establishing a commanded voltage limit, wherein the commanded voltage limit is a preset percentage of the operating speed.

4. The method of claim 3, wherein the preset percentage is about 90%.

5. The method of claim 1, further comprising detecting the operating speed.

6. The method of claim 1, wherein adjusting the turn-on angle comprises: generating an angle command by proportionally integrating the speed error; and clipping the angle command when the angle command is outside an angle limit.

7. The method of claim 6, wherein the voltage-frequency relationship comprises a constant voltage per hertz equation.

8. The method of claim 1, wherein switching to the voltage control further comprises:
   generating a voltage command;
   generating a regulated speed by multiplying the speed error by a voltage regulating percentage; and
   scaling the voltage command using the regulated speed.

9. The method of claim 1, wherein adjusting the turn-on angle further comprises maintaining a voltage-frequency relationship.

10. A method of controlling a motor running at an operating speed, the method comprising:
    determining a speed error between the operating speed and a speed command;
    adjusting an angle command to minimize the speed error while maintaining a voltage-frequency relationship;
    determining a retardation limit of the angle command from the speed; and
    switching to a voltage control when the retardation limit is reached.

11. The method of claim 10, wherein adjusting the angle command further comprises running the motor at a constant voltage-frequency relationship.

12. The method of claim 11, wherein the voltage-frequency relationship comprises a voltage per hertz equation.

13. The method of claim 12, further comprising:
    compensating the voltage command with a voltage compensation limit; and
    adjusting a duty cycle with the compensated voltage command.

14. The method of claim 10, further comprising determining a voltage command from the speed command and the operating speed.

15. The method of claim 10, further comprising adjusting an output duty cycle using the speed error.

16. The method of claim 10, wherein the voltage-frequency relationship further comprises a constant voltage-frequency relationship.

17. The method of claim 16, wherein the constant voltage-frequency relationship comprises a voltage per hertz equation.

18. The method of claim 10, further comprising switching between the voltage control and adjusting the turn-on angle with at least three voltage regulators.

19. The method of claim 10, wherein switching to the voltage control further comprises:
    generating a voltage command to the motor;
    generating a regulated speed by multiplying the speed error by a voltage regulating percentage; and
    scaling the voltage command using the regulated speed.

20. A control system of a motor, the control system comprising:

a comparator configured to compare a feedback speed and a commanded speed, and to generate a speed difference between the feedback speed and the commanded speed;

an angle control coupled to the comparator, and configured to receive the speed difference, and to adjust a turn-on angle in response to the speed difference; and a voltage control configured to be activated when the turn-on angle reaches a retardation limit, and to generate a voltage command.

21. The motor control system of claim 20, wherein the voltage control further comprises a voltage command limiter configured to limit the voltage command, and to generate a limited voltage command.

22. The motor control system of claim 20, wherein the voltage control further comprises at least one voltage regulator configured to regulate the voltage command, to reduce the voltage command when the commanded speed drops below a threshold, to generate a voltage regulating percentage, to adjust an duty cycle of the voltage command, and to maintain a constant voltage-frequency relationship.

23. The motor control system of claim 20, wherein the angle control further comprises a proportional integrator configured to minimize a turn-on angle error.

24. The motor control system of claim 20, further comprising a cascade accumulator configured to smooth voltage increase transition.

* * * * *